May 26, 1942. J. C. BARREDA ET AL 2,284,252

LIQUID DISPENSING DEVICE

Filed July 25, 1939

INVENTORS
Julian C. Barreda
Harold J. McLaughlin

Patented May 26, 1942

2,284,252

UNITED STATES PATENT OFFICE 2,284,252

LIQUID DISPENSING DEVICE

Julian C. Barreda, Flushing, and Harold J. McLaughlin, Brooklyn, N. Y.

Application July 25, 1939, Serial No. 286,424

4 Claims. (Cl. 221—67)

This invention relates to an improved device for dispensing milk or other liquids from a container into a drinking cup or other receptacle, it being an improvement over the inventions described in our Patents No. 1,965,045, 1,991,720 and 1,998,215 and it includes in combination a cooling chamber, an agitating device, and an improved outlet valve mechanism and other novel and useful features, presently described in detail.

The object of this invention is to provide an improved dispenser for milk or other beverages to be kept sanitary and cool between dispensing operations as well as during the dispensing operations, and to deliver the milk or beverage of uniform mixture into a cup or other receptacle in any quantities desired and in such position that the receptacles are in convenient position to be easily removed.

Another object is to provide a dispensing outlet which is fixed to the can so that it can be easily and conveniently cleaned and sterilized at the same time as the can.

Another object is to provide a flexible or pliable valve closure which is inserted in said outlet when the can is filled and is removed and thrown away when the can is emptied.

Another object is to provide a novel and simple device to agitate and mix the liquid in the container to provide a uniform mixture for dispensing.

Another object is to provide an improved valve controlling mechanism which normally holds the outlet valve closed to prevent flowing of liquid from the container and which is operable to permit the valve to open to dispense milk.

Other objects and important features are pointed out or implied in the following details of description in connection with the accompanying drawing, in which.

Referring to the drawing in detail in which the similar reference numerals refer to the similar parts in the several views, the invention is described in detail as follows.

Figure 1:
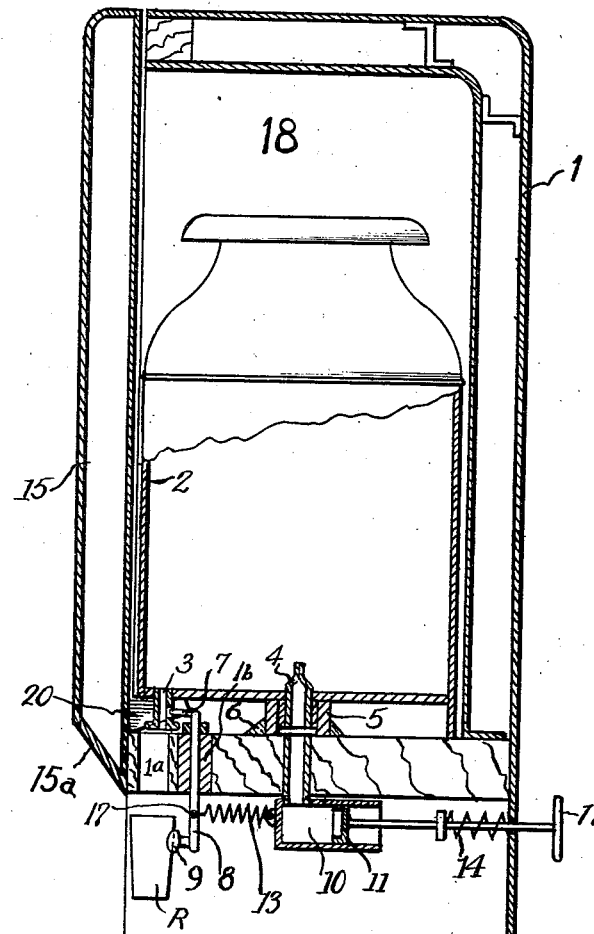
Fig. 1 is a sectional side view showing the milk can in dispensing position in an insulated cooling chamber which chamber is in an elevated position on a counter or stand of any suitable description so as to be convenient for dispensing. It also shows the valve control mechanism, the section being along the line 1—1 of Fig. 2.
Figure 2:
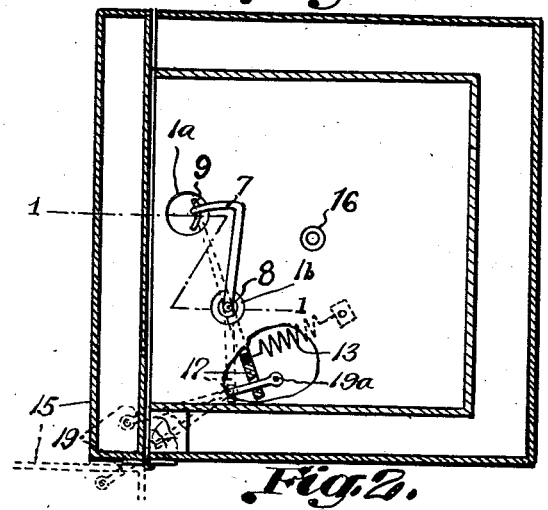
Fig. 2 is a horizontal sectional view showing the floor of the cooling chamber and showing the outlet opening and the valve control mechanism.

Air from the compressor 10 is forced through the air inlet valve 4 into the container 2 and through the liquid in the said container. This action agitates the liquid and maintains a uniform mixture. The compressor 10 is actuated either by an electric motor, a solenoid or any other appropriate and suitable mechanical or manual means. The compressor shown is manually operated by means of the handle 12. The rubber air inlet valve 4 is removable so that a new one may be used each time after the container is cleaned and sterilized.

The rubber sleeve 5 is placed between the floor of the cooling chamber 1 and the container 2 so that the air from the compressor 10 which is forced through the tube 16 will have to pass through the air inlet valve 4a and into the said container 2. 6 is an annular member for locating the rubber sleeve 5 in its proper position.

The bottom of the chamber 1 has a dispensing opening 1a therethrough, and adjacent to this opening is a vertical bearing 1b. The liquid container 2 is normally in the chamber 1 and has its dispensing outlet 3 directly over the opening 1a and normally closed by pressure of a pusher 7 against the compressible valve-closure 3a. The pusher 7 is united with a pivot 8 that is journaled in the bearing 1b and has arms extending laterally therefrom, one of these arms having an element 9 thereon in the proper relation to be pressed by a receptacle R when the latter is pushed under said dispensing opening; and such pressure against element 9 causes the pivot 8 to turn far enough to retract the pusher 7 and permit the resilient valve 3a to open for dispensing the liquid in the receptacle R. The other arm on the pivot 8 is seen at 11, and it has a retractile spring 13 connected thereto for returning the valve-control means 11—8—9—7 to the normal valve-closing position.

Figure 4:
Fig. 4 is an enlarged diametric sectional view of the outlet valve in the closed position with sealing cap removed.
Figure 3:
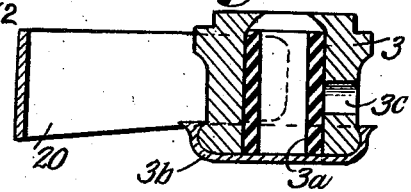
Fig. 3 is an enlarged diametric sectional view of the outlet or dispensing valve, showing the pliable valve closure in the open position with the valve sealing cap in place and with a cam's lower edge in position to be moved rightward and thereby push the cap down from the valved outlet.

To dispense the liquid from the container, a glass or other open top receptacle is pressed against the concave member 9 of the valve control mechanism, thus turning the mechanism about its pivot 8. This operation turns the unit 9—8—7—17 so that the apertured end of the arm 17 slides on the rod 19, away from the abutment 19a, and this same operation withdraws the prong or pusher 7 from the opening 3c (Figs. 3 and 4) of the outlet valve-casing 3, thereby permitting the valve-closure 3a to automatically open, and allowing the liquid to flow through the said outlet valve closure from the container into the glass. The coil spring 13, which is attached to the arm 17, normally holds the valve control mechanism in the valve-closing position with sufficient pressure to squeeze the valve closure 3a shut, so as to prevent the flow of liquid from the container. The valve closure 3a is merely a short tube made of some pliable and resilient material, such as rubber. The valve-casing 3 and valve-closure 3a constitute the dispensing valve.

The rod 19 passes through the apertured end of arm 17 and has an abutment 19a on its free end. The said rod 19 is pivotally fastened to the door of the cooling chamber, and when the door is opened, the rod 19 pulls the arm 17 and thus takes the prong 7 out of engagement with the outlet valve closure 3a. The container can then be removed and replaced. When the door is closed the spring 13 returns the mechanism to its closed position ready for dispensing.

Figure 5:
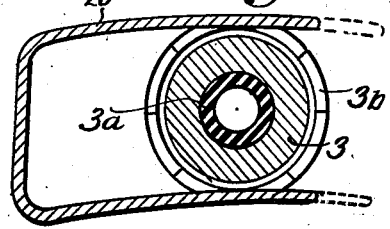
Fig. 5 is a horizontal sectional view substantially along the line 5—5 of Fig. 3, the cam being shown in full lines in the position of Fig. 3, and in broken lines in its rightward position.

When the door 15 is being closed, after the container and its liquid contents are placed in the chamber 1, the lower inclined edge (see Fig. 3) of the cam or wedge-like element 20 slides over and upon the upper edge of the closing cap 3b, from the full-line position to the broken line position of Fig. 5; and this element 20, being held against rising, by its union with the door, exerts a wedge-like action on the cap 3b and thereby pushes the cap down off from the valve-member 3, thus effecting the opening of the lower end of the valve-member.

A section of the door is cut away at 15a so that the glass or receptacle will be visible while being filled without undue bending or stooping.

The method of refrigeration shown for the purpose of illustration is with ice, but any suitable refrigerating means may be used whether mechanical, electrical or otherwise.

Although we have described this embodiment of our invention specifically, it is not our intention to limit our patent protection to these specific details of construction, arrangement or combination for the invention is susceptible of numerous changes within the scope of the inventive ideas herein implied and hereafter claimed.

What we claim as our invention is:

1. In a liquid dispenser, the combination of a liquid container having a dispensing valve at its lower end, a chamber having a door and having a floor provided with an opening over which said dispensing valve normally rests in proper position to deliver liquid from said container to an open-top receptacle, a valve-control means operable by pressure of said open-top receptacle thereagainst so as to effect the flow of liquid through said dispensing valve into said receptacle while said pressure is maintained, said valve-control means being cooperative with said valve to cause the flow of said liquid to cease when said pressure is omitted, and controlling means for disconnecting said valve-control means from said valve when the door is opened, thereby to permit the liquid container 2 to be removed and replaced while free from interference with or by said valve-control means.

2. The combination in a liquid dispenser, of a chamber having a door, a liquid container normally in said chamber and having a dispensing outlet provided with a valve, a sealing unit adapted to be secured to and removed from said outlet, and means operatively connected with said door for effecting removal of said sealing unit from said outlet by the closing of said door, thereby permitting liquid to flow from said liquid container when said valve is opened.

3. In a liquid dispenser, the combination of a chamber having a dispensing opening therein and a vertical pivot-bearing adjacent to said dispensing opening, a liquid container normally in said chamber and having a dispensing outlet normally over said dispensing opening, a resilient flexible tubular valve-closure in said dispensing outlet and adapted to be compressed for closing it, and a valve-control means for compressing said valve-closure, said valve-control means including a pivotal element extending through said pivot-bearing and having a pusher thereon for engagement with said valve-closure, said valve-control means also including an element in proper relation to be pressed by a receptacle which is pushed under said dispensing opening and thereby turns said pivotal element so as to retract said pusher from said resilient valve-closure.

4. The combination defined by claim 3, and spring means connected to said valve-control means in the proper relation for causing said pusher to compress said resilient valve-closure.

JULIAN C. BARREDA.
HAROLD J. McLAUGHLIN.